No. 861,235. PATENTED JULY 23, 1907.
W. C. HUYCK.
PEANUT ROASTER.
APPLICATION FILED DEC. 4, 1905.
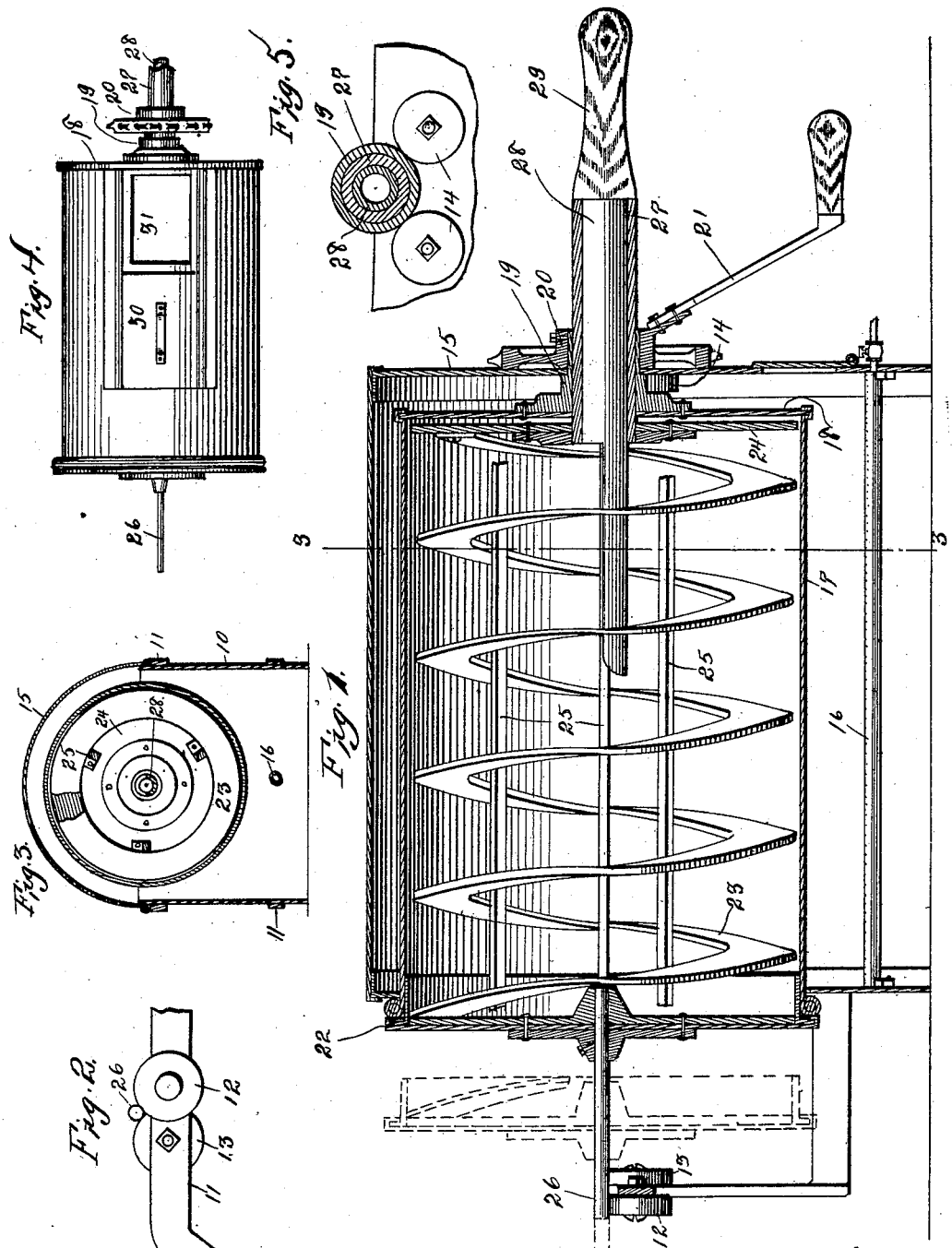
Witnesses:
A. L. Reibrock
S. F. Christy.
Inventor: W. C. Huyck
By Orwig & Lane attys

UNITED STATES PATENT OFFICE.

WILLIAM C. HUYCK, OF DES MOINES, IOWA.

PEANUT-ROASTER.

No. 861,235.  Specification of Letters Patent.  Patented July 23, 1907.

Application filed December 4, 1905. Serial No. 290,118.

*To all whom it may concern:*

Be it known that I, WILLIAM C. HUYCK, a citizen of the United States, residing at Des Moines, in the county of Polk and State of Iowa, have invented a certain new and useful Peanut-Roaster, of which the following is a specification.

The objects of my invention are to provide a peanut roaster of simple, durable and inexpensive construction in which the peanuts are not only roasted, but are delivered from the interior of the roasting cylinder when they are sufficiently roasted.

A further object is to provide a roaster of this character which can be operated either by hand or from a power machine at the pleasure of the operator, and further to provide a tester which serves the double function of testing the roasting peanuts and also serve as a handle for sliding the spiral conveyer longitudinally of the roasting cylinder in order to have it operate to convey the peanuts to the exterior of the cylinder.

My invention consists in certain details in the construction, arrangement and combination of the various parts of the device, whereby the objects contemplated are attained, as hereinafter more fully set forth, pointed out in my claims and illustrated in the accompanying drawings, in which—

Figure 1 is a sectional view of the roaster, and shows in elevation the spiral conveyer. Fig. 2 is a detail view of the rollers on which the shaft that supports one end of the roasting cylinder operates. Fig. 3 is a sectional view cut on the line 3—3 of Fig. 1. Fig. 4 is a plan view of the roasting cylinder, and Fig. 5 is a detail view of the rollers on which the axle that supports one end of the roasting cylinder is mounted.

In the accompanying drawings, I have used the reference numeral 10 to indicate the supporting frame of the device. Secured to one end of the supporting frame 10 is a bar 11, the upper portion of which is substantially in line with the upper portion of the supporting frame 10. Rotatably mounted on the outer side of the bar 11 is a wheel 12, and rotatably mounted on the inside of the bar 11 is a wheel 13. These wheels 12 and 13 overlap each other and have their peripheries made smooth to form a bearing for the rod which supports one end of the roasting cylinder. Rotatably secured to the inner portion of the rear end of the frame 10 are two wheels 14 which form a bearing for the axle which supports the forward end of the roasting cylinder.

I have provided a cover 15 which is substantially semi-circular in cross section and is adapted to rest on the supporting frame 10 and retain the heat. Extending longitudinally of the lower portion of the supporting frame 10 is a fuel supply pipe 16. I have provided a rotating cylinder which is largely inside of the casing 10, and the cover 15, and which comprises a body portion 17 and a rear end 18 secured in it which has an axle 19 secured to it which rests on the rollers 14 and extends outwardly from said rollers through the rear end of the frame 10 and the cover 15 and has mounted at its outer rear end the sprocket wheel 20 by which the rotating cylinder can be driven from a power machine. Detachably connected with the sprocket wheel 20 is a crank 21 designed to be used for rotating the roasting cylinder when power is not applied.

Detachably mounted in the body portion 17 of the roasting cylinder is a disk 22 which forms the forward end of the roasting cylinder and also forms the forward end of the spiral conveyer 23, which spiral conveyer is attached at its rear end to a disk 24; that is normally mounted adjacent to the end 18 of the roasting cylinder The disks 22 and 24 are connected with each other by a series of bars 25 to maintain the parts of the spiral conveyer in position relative to each other. Secured to the central portion of the disk 22 is a shaft 26 which forms the forward axis of the roasting cylinder and which is designed to rest on the wheels 12 and 13 as the roasting cylinder is rotated, and is so constructed that the shaft 26 can slide longitudinally over the wheels 12 and 13. Extending through the axle 19, the end 18 of the roasting cylinder and the disk 24 is a collar 27. Slidingly mounted in this collar is a test tube 28, having the handle 29 at its outer end. The inner end of the test tube is substantially semi-circular in cross section and is designed to receive peanuts in it so that when it is desired to test the peanuts which are being roasted in the roasting cylinder, the operator can do so by withdrawing the test tube from the collar 27. The handle 28 of the test tube is so constructed that it engages the end of the collar 27 so that when it is desired to slide the spiral conveyer longitudinally of the cylinder, the operator grasps the handle and pushes on it so that the forward end of the conveyer takes the position shown in dotted lines in Fig. 1. When the roasting cylinder is in this position; that is, at its forward limit of movement and is being rotated, the spiral conveyer will move the peanuts to the forward end of the cylinder and they will be allowed to drop out of it between the disk 22 and the forward end of the body portion 17. The action of gravity causes the peanuts to be constantly moved toward the bottom of the cylinder, and the rotation of the cylinder and the spiral conveyer causes the peanuts to be advanced. In one side of the roasting cylinder I have provided a slide 30 to cover the opening 31 in the cylinder when the slide is in its closed position. Through this opening the peanuts are poured into the roasting cylinder.

By the use of my device, the peanuts can be roasted and delivered while hot without the necessity of touching the cylinder in which they are roasted, and the same mechanism is used for rotating the cylinder in roasting peanuts as in rotating the cylinder for delivering the peanuts to a point of discharge.

Having thus described my invention, what I claim and desire to secure by Letters Patent of the United States, therefor is—

1. In a peanut roaster, a rotatably mounted roasting cylinder, a slidingly mounted spiral conveyer normally in the cylinder and capable of being moved partially outside of it.

2. In a peanut roaster, a supporting frame, a cylinder rotatably mounted on the frame, and a spiral conveyer slidingly mounted in the cylinder.

3. In a peanut roaster, a supporting frame, a cylinder rotatably mounted on the frame, a spiral conveyer slidingly mounted in the cylinder, and means for moving the sliding conveyer longitudinally of the cylinder.

4. In a peanut roaster, a supporting frame, a cylinder rotatably mounted on the frame, a spiral conveyer slidingly mounted in the cylinder, and a cover mounted above the cylinder and designed to rest on the frame.

5. In a peanut roaster, a supporting frame, a cylinder rotatably mounted on the frame, a spiral conveyer slidingly mounted in the cylinder, a cover mounted above the cylinder and designed to rest on the frame, and means for moving the sliding conveyer longitudinally of the cylinder.

6. In a peanut roaster, a supporting frame, a cylinder rotatably mounted on the frame, a spiral conveyer slidingly mounted in the cylinder, and means for rotating the cylinder and the spiral conveyer simultaneously.

7. In a peanut roaster, a supporting frame, a cylinder rotatably mounted on the frame, a spiral conveyer slidingly mounted in the cylinder, means for moving the sliding conveyer longitudinally of the cylinder, and means for rotating the cylinder and the spiral conveyer simultaneously.

8. In a peanut roaster, a supporting frame, a cylinder rotatably mounted on the frame, a spiral conveyer slidingly mounted in the cylinder, a cover mounted above the cylinder and designed to rest on the frame, means for moving the sliding conveyer longitudinally of the cylinder, and means for rotating the cylinder and the spiral conveyer simultaneously.

9. In a peanut roaster, a supporting frame, a cylinder rotatably mounted on the frame, a spiral conveyer slidingly mounted in the cylinder, means for moving the sliding conveyer longitudinally of the cylinder, and a fuel supply pipe mounted beneath the cylinder.

10. In a peanut roaster, a supporting frame, a cylinder rotatably mounted on the frame, a spiral conveyer slidingly mounted in the cylinder, means for moving the sliding conveyer longitudinally of the cylinder, and a detachable test tube leading from the exterior of the frame into the interior of the cylinder.

11. In a peanut roaster, a supporting frame, a pair of rollers mounted adjacent to one end of the supporting frame, a second pair of rollers mounted on the other end of the frame, a cylinder adjacent to the frame, an axle secured to one end of the cylinder, mounted on the second pair of rollers, a disk forming the other end of the cylinder, a shaft secured to said disk, slidingly and rotatably mounted on the first mentioned pair of rollers, a second disk adjacent to the first mentioned end of the cylinder, a spiral mechanism connecting the disks and with them forming a spiral conveyer, a collar secured to the disk adjacent to the first mentioned end of the cylinder, passing through the axle, means secured to said axle for rotating the cylinder, and a test tube extending through the collar into the cylinder.

WILLIAM C. HUYCK.

Witnesses:
S. F. CHRISTY,
A. G. HAGUE.